June 15, 1937.　　　G. E. MIRFIELD　　　2,084,040
TOOL SUPPORT
Filed July 5, 1935　　　2 Sheets-Sheet 1
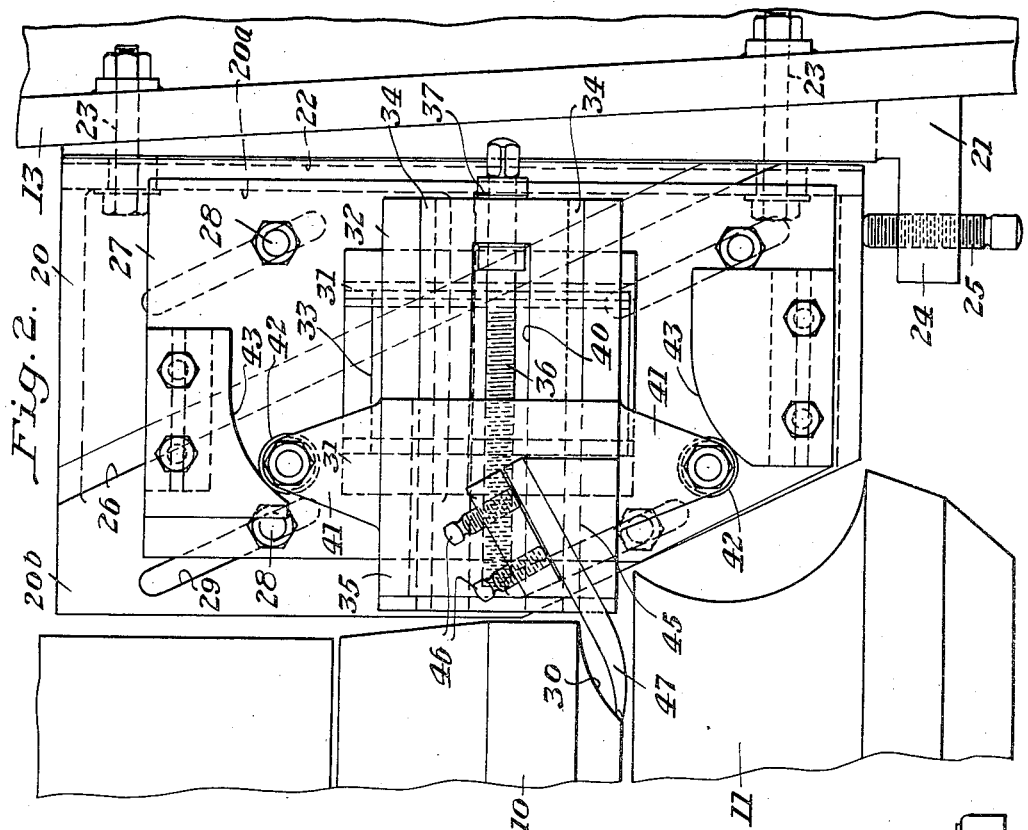
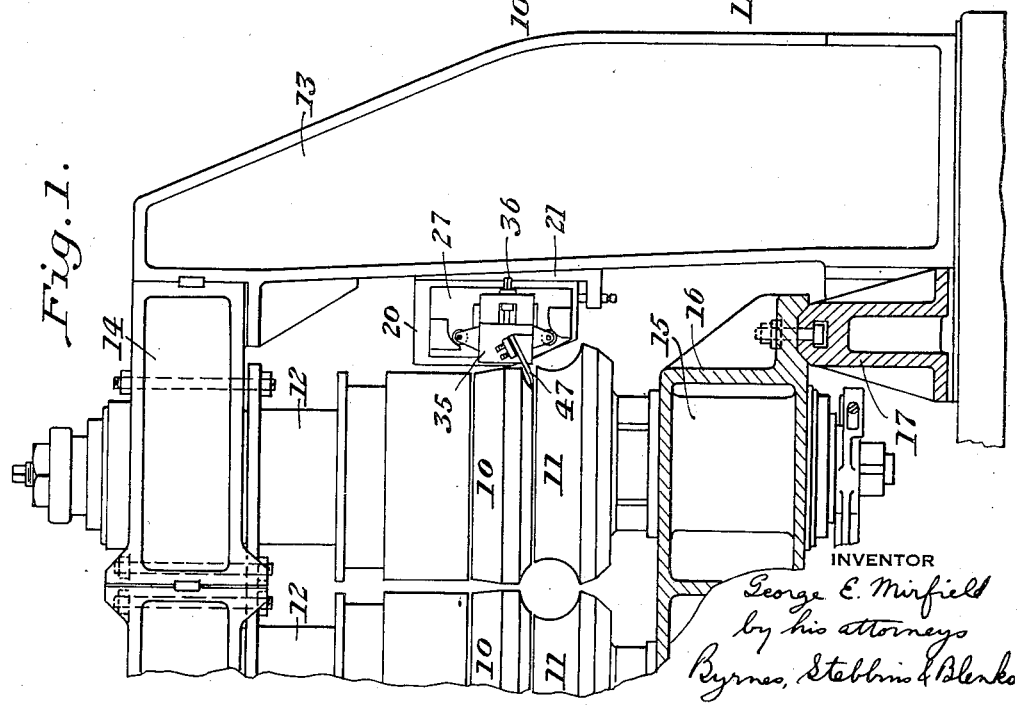
INVENTOR
George E. Mirfield
by his attorneys
Byrnes, Stebbins & Blenko June 15, 1937. G. E. MIRFIELD 2,084,040
TOOL SUPPORT
Filed July 5, 1935 2 Sheets-Sheet 2
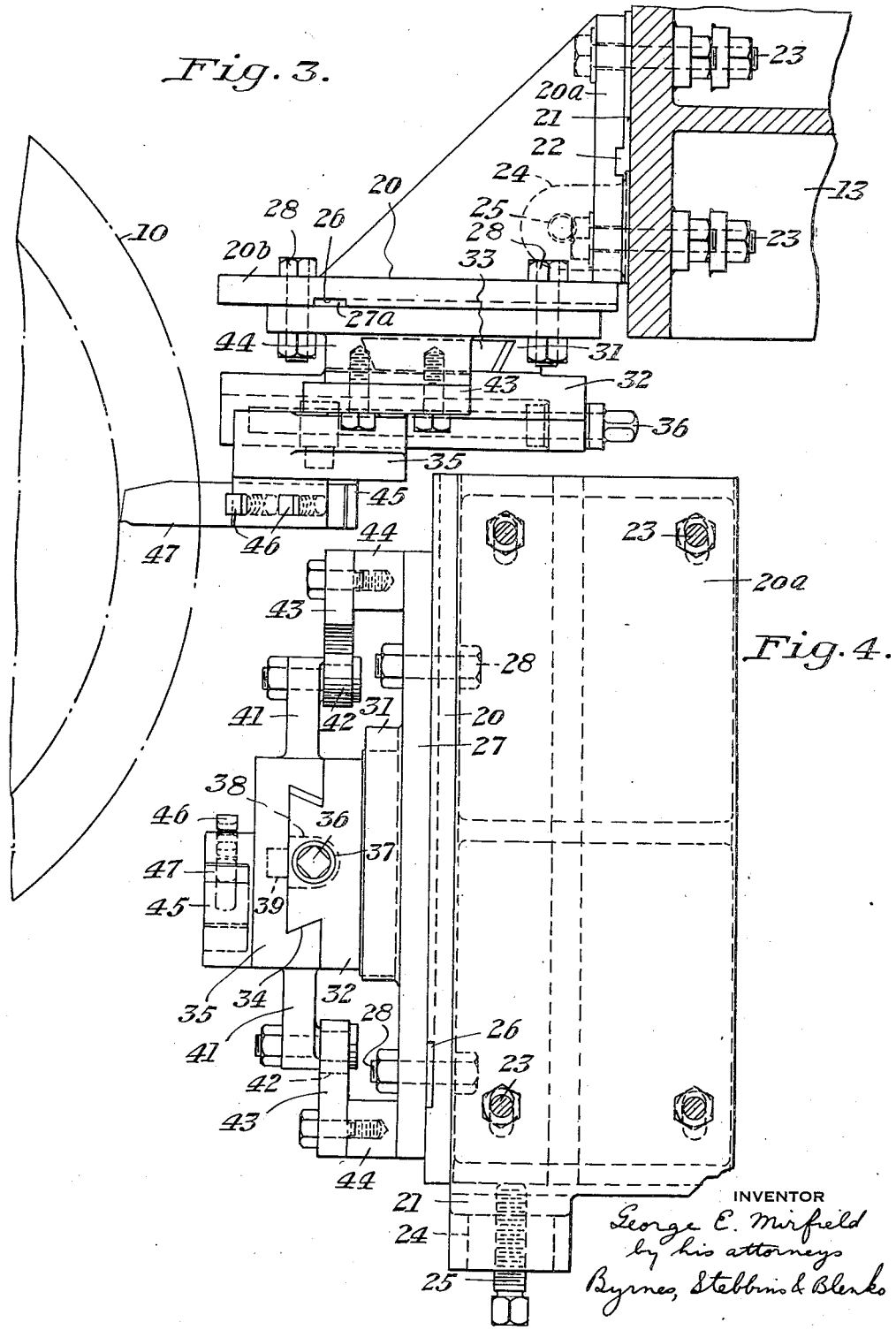

Patented June 15, 1937

2,084,040

UNITED STATES PATENT OFFICE 2,084,040

TOOL SUPPORT

George E. Mirfield, Youngstown, Ohio, assignor to The Youngstown Sheet & Tube Company, Youngstown, Ohio, a corporation of Ohio Application July 5, 1935, Serial No. 29,906

6 Claims. (Cl. 82—14)

My invention relates to an adjustable support for a turning tool, and, in particular, a support for a tool adapted to work on a member adapted to have rotary movement in operation, specifically, an electrode roll of an electric welder.

While it has been proposed heretofore to maintain the contour of welding electrodes by dressing with a suitable tool, no such device with which I am familiar is suitable for use in connection with the welding apparatus described and claimed in my co-pending application Serial No. 712,917 filed February 26, 1934. The apparatus described therein includes electrode rolls mounted for rotation about spaced vertical axes and designed to engage the work over a rather wide zone. The resulting configuration of the electrode surface which engages the work is such that no known tool support could be employed for holding and moving a tool in engagement with such surface.

In accordance with my invention, I provide a tool support adapted to be secured to the frame of the welder and capable of shifting the tool in a predetermined path required to conform to the contour of the electrode. For a complete understanding of the invention, reference is made to the accompanying drawings illustrating a present preferred embodiment, although it is to be understood that changes in the construction described and illustrated may be made within the scope of my broader claims. In the drawings—

Figure 1 is a partial side elevation of a welder as described and claimed in my co-pending application, having the invention applied thereto;

Figure 2 is a side elevation of the tool support to enlarged scale;

Figure 3 is a plan view showing the welder frame in section; and

Figure 4 is an end view.

Referring now in detail to the drawings, and for the moment to Figure 1 in particular, the welder includes electrodes 10 and pressure rolls 11 defining a welding throat having the shape of the work to be welded, in this case pipes and tubes. The electrodes 10 are mounted for rotation in bearings 12 depending from a supporting frame including columns 13 and a transom 14. The pressure rolls 11 are similarly mounted in bearings 15 carried in the base member 16 slidable on rails 17. As will be apparent from Figure 1, the axes of the electrodes and pressure rolls are not in alignment. The pressure rolls thus extend outwardly beyond the periphery of the electrode rolls, imposing rather severe space limitations upon any construction of tool adapted to engage the electrode, and the support therefor.

Turning now to Figures 2 through 4 for a detailed description of the invention proper, which is illustrated in Figure 1 in relation to the welder itself, the tool support is carried on an angle bracket 20. The bracket 20 is slidable vertically on a base plate 21 by means of a cooperating tongue and groove 22. The plate 21 is secured to the flange of the column 13 by bolts 23.

The portion of the angle bracket 20 indicated at 20a engaging the base plate 21, is slotted to receive the bolts 23 so as to permit vertical adjustment of the bracket on the plate. When the adjustment has been made, the bolts are tightened down. The plate 21 has a projection 24 through which is threaded an adjusting screw 25 adapted to engage and temporarily support the bracket 20 for vertical adjustment thereof.

The portion of the bracket 20 extending at an angle to the flange on the column 13, indicated at 20b, is provided with an inclined groove 26. A plate 27 is secured to the face 20b of the bracket 20 by bolts 28 and has a tongue 27a entering the groove 26 and cooperating therewith to guide sliding movement of the plate 27 on the face 20b. The latter has slots 29 for receiving the bolts 28, whereby the plate 27 can be clamped to the face 20b after the desired adjustment thereof. The slots, of course, extend parallel to the groove 26. The inclination of the groove 26 and the slots from the vertical provides lateral movement of the plate 27 as well as vertical adjustment thereof, to bring the turning tool, to be described later, into the desired relation with the work represented by the curved surface 30 of the electrode 10.

The plate 27 is provided with vertical ways 31 in which a slide 32 is reciprocable. The slide 32 has a dovetail 33 cooperating with similarly shaped portions of the guides 31. The slide 32 has horizontal ways 34 formed thereon. A transverse slide 35 is reciprocable along these ways. A feed screw 36 is journalled in a thrust bearing 37 carried at one end of the slide 32 and is threaded into a block 38 having a projection 39 by which it is keyed into the slide 35. The block 38 moves in a groove 40 between the ways 34.

The slide 35 has projections 41 extending upwardly and downwardly therefrom. Rolls 42 are journalled in these projections for engagement with cams 43 carried on the plate 27. The cams 43 are adjustably secured to blocks 44 extending outwardly from the plate 27.

The slide 35 also carries a tool clamp 45 provided with clamping screws 46, whereby a turning tool such as that indicated at 47, may be secured in proper relation to the surface 30 for either scraping off accretions or accurately turning off a portion of the surface itself.

The contours of the cams 43 are such as to cause the cutting edge of the tool 47 to traverse the contour of the surface 30 as the slide 35 is moved across the ways 34. Such movement of the slide 35, of course, causes vertical movement of the slide 32 in the ways 31. In operation, the plate 27 and the slide 35 are adjusted so that the tool engages the surface 30 at one extremity or the other and then, by operation of the screw 36, the tool is caused to traverse the entire width of the surface.

It will be apparent from the foregoing description that the invention provides a simple yet effective means of either turning off a portion of the electrode surface or simply removing accretions of material which are deposited thereon during the welding operation. In either case, the tool is caused to follow the contour of the work with great accuracy so that the contour originally existing is preserved throughout the life of the electrode. As the electrode surface wears or is turned off, of course, the tool is adjusted upwardly by means of the plate 27.

It will be apparent that an electrode trimming device in accordance with my invention may be mounted for cooperation with each of the electrodes 10 of the welder shown in Figure 1. Since the tool supports are mounted on the columns 13, they do not constitute any obstruction to the movement of work through the welder or to easy accessibility to the working parts of the latter.

Although I have illustrated and described but one preferred embodiment of the invention, it will be apparent that numerous changes therein may be made without departing from the spirit of the invention or the scope of the appended claims.

I claim:

1. A tool holder comprising a base plate, a slide freely movable longitudinally thereof, a second slide carried on the first and movable transversely therealong, a tool holder carried by the second slide, cooperating means on said slides for effecting movement of one relative to the other, and cooperating cam means on one of said slides and said plate for effecting longitudinal movement of both slides on movement of said one of said slides.

2. A tool holder comprising a base plate, a tool holding slide, a supplementary supporting slide mounted on said base plate for movement therealong, the tool holding slide being mounted on the supplementary slide for movement thereon at an angle to the path of movement of said supplementary slide, means for shifting the tool holding slide relative to said supplementary slide, and cooperating cam means on the tool holding slide and the base plate for effecting movement of both slides on transverse movement of the tool holding slide relative to the supplementary slide.

3. A tool holder comprising a base plate disposed substantially vertically, a compound slide mounted thereon having members movable vertically and horizontally, means for moving the horizontally movable member along the vertically movable member, and cooperating cam means on the plate and the horizontally movable member for effecting vertical movement of both said members on movement of the horizontally movable member relatively to the vertically movable member.

4. A tool holder comprising a plate, a slide movable thereon, a second slide movably carried on the first, a feed screw for moving the second slide relative to the first and cooperating cam means on the second slide and said plate effective to shift both slides in the direction in which the first slide is movable, on movement of the second slide relative to the first.

5. In a tool holder, a base, a slide movable therealong in a predetermined path, a second slide mounted on the first for movement in a path at an angle to said first mentioned path, cooperating means on said slide for effecting relative movement therebetween, and cooperating means on the second slide and said base effective to move both slides on such relative movement.

6. A tool holder comprising a base, a slide movable on the base, a second slide movable on the first in a direction at an angle to the direction of movement of the first mentioned slide, means on the base and the second slide effective to move the first mentioned slide in its path on relative movement between the two slides, and means for moving one slide relative to the other.

GEORGE E. MIRFIELD.